(12) United States Patent
Lin

(10) Patent No.: US 10,248,377 B2
(45) Date of Patent: Apr. 2, 2019

(54) PHOTOINDUCTION LOUDSPEAKER, PHOTOINDUCTION LOUDSPEAKER CONTROL METHOD AND APPARATUS

(71) Applicant: GUANG DONG OPPO MOBILE TELECOMMUNICATIONS CORP., LTD., Dongguan, Guangdong (CN)

(72) Inventor: Shangbo Lin, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 15/100,736

(22) PCT Filed: Nov. 30, 2015

(86) PCT No.: PCT/CN2015/096056
§ 371 (c)(1),
(2) Date: Jun. 1, 2016

(87) PCT Pub. No.: WO2016/091096
PCT Pub. Date: Jun. 16, 2016

(65) Prior Publication Data
US 2016/0364208 A1   Dec. 15, 2016

(30) Foreign Application Priority Data

Dec. 10, 2014   (CN) .......................... 2014 1 0757788

(51) Int. Cl.
*G06F 3/16*   (2006.01)
*G01J 1/44*   (2006.01)
(Continued)

(52) U.S. Cl.
CPC ............... *G06F 3/165* (2013.01); *G01J 1/44* (2013.01); *H04R 1/028* (2013.01); *H04R 3/00* (2013.01); *G01J 1/4204* (2013.01)

(58) Field of Classification Search
CPC . G06F 3/165; G01J 1/44; H04R 1/028; H04R 3/00
See application file for complete search history.

(56) References Cited

U.S. PATENT DOCUMENTS

2005/0069153 A1* 3/2005 Hall ..................... H03G 5/025
                                                      381/103
2009/0185698 A1   7/2009 Liao et al.
(Continued)

FOREIGN PATENT DOCUMENTS

CN   101388234 A   3/2009
CN   201515418 U   6/2010
(Continued)

OTHER PUBLICATIONS

EPO, Office Action for EP Application No. 15864300, dated Jun. 20, 2018.

*Primary Examiner* — Sonia L Gay
(74) *Attorney, Agent, or Firm* — Hodgson Russ LLP

(57) ABSTRACT

A photoinduction loudspeaker, photoinduction loudspeaker control method and apparatus are provided. The photoinduction loudspeaker includes a loudspeaker and a photoinduction device. The photoinduction device is configured to acquire a light intensity value of an ambient environment where the loudspeaker is located and the photoinduction device transmits the light intensity value to the loudspeaker. The loudspeaker controls its own playing status based on the light intensity value. The photoinduction loudspeaker in the present invention is capable of identifying the ambient environment for selecting its own playing status based on the ambient environment in order to provide more intelligent service for a user.

11 Claims, 3 Drawing Sheets

(51) Int. Cl.
*G01J 1/42* (2006.01)
*H04R 1/02* (2006.01)
*H04R 3/00* (2006.01)

(56) References Cited

U.S. PATENT DOCUMENTS

| | | | |
|---|---|---|---|
| 2009/0201375 A1* | 8/2009 | Babala | B60T 8/885 |
| | | | 348/187 |
| 2010/0176965 A1* | 7/2010 | Fukumura | H04Q 9/00 |
| | | | 340/870.01 |
| 2010/0179938 A1 | 7/2010 | Wu et al. | |
| 2011/0150431 A1* | 6/2011 | Klappert | H04N 7/163 |
| | | | 386/296 |
| 2013/0077803 A1* | 3/2013 | Konno | H04R 1/323 |
| | | | 381/107 |
| 2014/0093085 A1* | 4/2014 | Jarvis | H04R 27/00 |
| | | | 381/17 |
| 2016/0364208 A1 | 12/2016 | Lin | |

FOREIGN PATENT DOCUMENTS

| | | | | |
|---|---|---|---|---|
| CN | 101777362 A | | 7/2010 | |
| CN | 103686523 A | * | 3/2014 | H04R 1/20 |
| CN | 103686523 A | * | 3/2014 | |
| CN | 104540072 A | | 4/2015 | |

\* cited by examiner

PHOTOINDUCTION LOUDSPEAKER, PHOTOINDUCTION LOUDSPEAKER CONTROL METHOD AND APPARATUS

CROSS REFERENCE TO RELATED APPLICATION

This application is a National Stage of International Application No. PCT/CN2015/096056 filed Nov. 30, 2015, claiming priority based on Chinese Patent Application No. 201410757788.0 filed Dec. 10, 2014, the contents of all of which are incorporated herein by reference in their entirety.

BACKGROUND

Field

The present invention relates to a technical field of an intelligent loudspeaker, and more particularly to a photoinduction loudspeaker, photoinduction loudspeaker control method and apparatus.

Background

With the development of the technology, an intelligent loudspeaker is increasingly used in various applications. The intelligent loudspeaker is integrated with a network interface. Mobile terminals, e.g. mobile phones, tablet computers, etc., are pre-installed with application programs, browse streaming music on the Internet via network interfaces, and select some songs in order to forward the songs to the intelligent loudspeakers for playing.

Generally, the intelligent loudspeaker is placed in a fixed site, such as the home. How to enable the loudspeaker to identify the ambient environment and to provide more intelligent service for the user is a technological problem which needs to be resolved without delay during the intelligent development of the technology.

SUMMARY OF THE INVENTION

Based on the above-mentioned drawbacks, one objective of the present invention is to provide a photoinduction loudspeaker, photoinduction loudspeaker control method and apparatus to improve the technique of conventional intelligent loudspeaker so that the loudspeaker can identify an ambient environment in order to provide more intelligent service for a user.

In a first embodiment, the present invention provides a photoinduction loudspeaker, characterized in that the photoinduction loudspeaker comprises a loudspeaker and a photoinduction device;

wherein the photoinduction device is configured to acquire a light intensity value of an ambient environment where the loudspeaker is located and the photoinduction device transmits the light intensity value to the loudspeaker;

wherein the loudspeaker controls its own playing status based on the light intensity value.

In a second embodiment, the present invention provides a photoinduction loudspeaker control method, characterized in that the method comprises:

acquiring a light intensity value of an ambient environment where a photoinduction loudspeaker is located by the photoinduction loudspeaker; and controlling a playing status of the photoinduction loudspeaker based on the light intensity value by the photoinduction loudspeaker.

In a third embodiment, the present invention provides a photoinduction loudspeaker control apparatus, characterized in that the photoinduction loudspeaker control apparatus comprises:

an acquisition unit, configured to acquire a light intensity value of an ambient environment where a photoinduction loudspeaker is located; and a playing control unit, configured to control a playing status of the photoinduction loudspeaker based on the light intensity value.

In a fourth embodiment, the present invention provides an apparatus, characterized in that the apparatus comprises:

at least one processor;

a storage unit; and at least one application program, being stored in the storage unit, wherein when the at least one processor executes the at least one application program, the photoinduction loudspeaker control method of the second embodiment is performed.

In a fifth embodiment, the present invention provides a non-volatile computer storage media, characterized in that:

the non-volatile computer storage media stores therein at least one application program wherein when an apparatus executes the at least one application program, the apparatus performs the photoinduction loudspeaker control method of the second embodiment.

In the embodiments of the present invention, the loudspeaker is combined to the photoinduction device to allow the photoinduction device to acquire the light intensity value of the ambient environment where the loudspeaker is located and the light intensity value is transmitted to the loudspeaker so that the loudspeaker is capable of controlling its own playing status based on the light intensity value. In the embodiments of the present invention, the loudspeaker is able to identify the ambient environment for selecting its own playing status based on the ambient environment in order to provide more intelligent service for the user.

DETAILED DESCRIPTION OF THE PREFERRED EMBODIMENTS

The following embodiments refer to the accompanying drawings for exemplifying specific implementable embodiments of the present invention. It should be noted that the exemplary described embodiments are configured to describe and understand the present invention, but the present invention is not limited thereto.

First Embodiment

Figure 1:
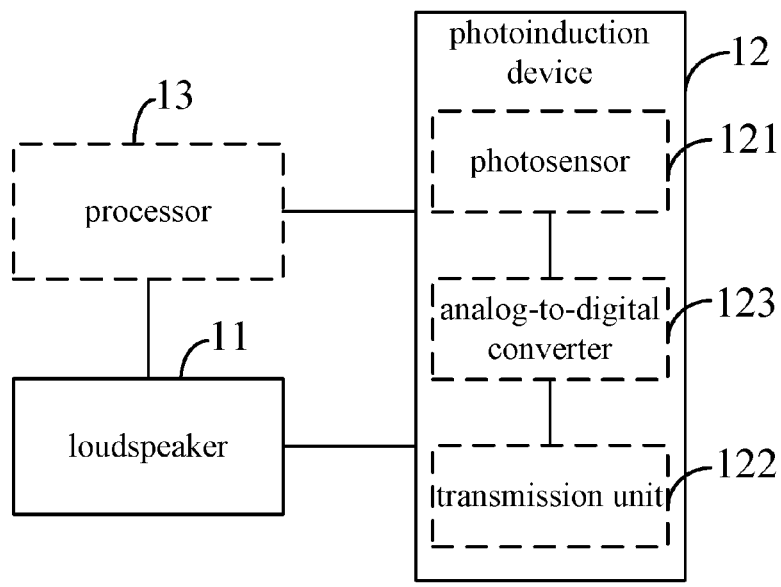
FIG. 1 is a block diagram of a photoinduction loudspeaker according to a first embodiment of the present invention.

Please refer to FIG. 1, which is a block diagram of a photoinduction loudspeaker according to a first embodiment of the present invention. As shown in FIG. 1, the photoinduction loudspeaker in the first embodiment includes a loudspeaker 11 and a photoinduction device 12.

In this embodiment, the photoinduction device 12 is configured to acquire a light intensity value of an ambient environment where the loudspeaker 11 is located and transmits the light intensity value to the loudspeaker 11. The loudspeaker 11 is capable of controlling its own playing status based on the light intensity value.

Figure 2:
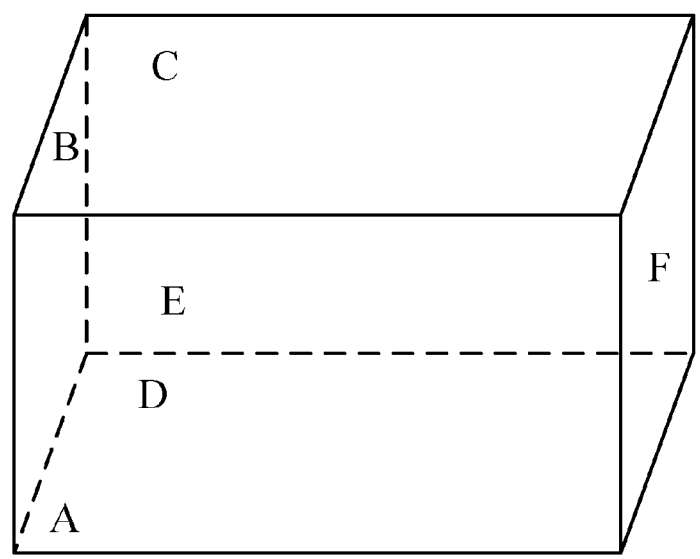
FIG. 2 is a schematic perspective view of the photoinduction loudspeaker according to the first embodiment of the present invention.

In this embodiment, the loudspeaker 11 is a general loudspeaker, such as an intelligent network loudspeaker. The photoinduction device 12 includes one or more optical sensors or photosensors 121 to acquire the light intensity value in the ambient environment where the loudspeaker 11 is located. For example, a dedicated slot or hole disposed on the outer shell of the intelligent network loudspeaker is configured to install the optical sensors. In one embodiment, the external surface of the optical sensors 121 is covered with a material, which is selected from one group consisting of transparent plastic material, semi-transparent material, glass and other similar material, to ensure sufficient light transmission to the optical sensors 121. In details, as shown in FIG. 2, the optical sensors 121 can be installed on the front surface A, top surface C, left-hand surface D, right-hand surface B, or rear surface E. Number of the optical sensor 121 can be one, also can be more, in order to acquire better effect. If a plurality of optical sensors 121 are arranged, these optical sensors 121 are preferably assembled in different surfaces of the outer shell.

In one embodiment, the photoinduction device 12 further includes a transmission unit 122 for transmitting the light intensity value to the loudspeaker 11 after the photosensors 121 acquires the light intensity value of the ambient environment where the loudspeaker 11 is located.

In one embodiment, the photoinduction device 12 further includes an analog-to-digital converter 123.

The photosensor 121 is configured to acquire an analog value of the ambient environment where the loudspeaker 11 is located.

The analog-to-digital converter 123 is configured to convert the analog value of the light intensity value into a digital value of the light intensity value.

In one embodiment, the loudspeaker 11 is capable of playing the songs, adjusting the volume of the songs, stopping the playback of songs, turning on the loudspeaker, switching to a standby mode or turning off the loudspeaker based on the light intensity value.

For example, the loudspeaker 11 adjusts the volume level based on the acquired light intensity value. For example, in one scene, when the user dims the light in the bedroom before going to bed, meanwhile, the light intensity value is decreased and the loudspeaker 11 automatically lowers the volume level for giving the user a good night's sleep. In another scene, the loudspeaker 11 is based on the light intensity value acquired for automatically selecting the music style and types. Still in another scene, the loudspeaker 11 automatically shuts off when the light intensity value acquired by the loudspeaker 11 is less than a threshold value. For example, the loudspeaker 11 enters a standby mode or shuts off when the user turns off the light to go to bed.

In one embodiment, the photoinduction loudspeaker can further include a processor 13.

The processor 13 is connected to the photoinduction device 12 via a digital bus, receives the light intensity value, which is acquired by the photoinduction device 12, of an ambient environment where the loudspeaker is located, and controls the playing status of the loudspeaker 11 based on the light intensity value.

For example, the processor 13 receives the light intensity value, which is acquired by the photoinduction device 12, of the ambient environment where the loudspeaker is located and adjusts the volume based on the acquired light intensity value. Any one of the following scenes can be taken. In one scene, when the user dims the light in the bedroom before going to bed, meanwhile, the light intensity value is decreased and the processor 13 controls the loudspeaker 11 for automatically lowering the volume level to give the user a good night's sleep. In another scene, the processor 13 controls the loudspeaker 11 based on the light intensity value for automatically selecting the music style and types. Still in another scene, the processor 13 controls the loudspeaker 11 to be automatically shut off when the processor 13 ensures that the acquired light intensity value is less than a threshold value. For example, the processor 13 controls the loudspeaker 11 to enter a standby mode or shuts off when the user turns off the light to go to bed.

In the first embodiment, the loudspeaker 11 is combined to the photoinduction device to allow the photoinduction device 12 to acquire the light intensity value of the ambient environment where the loudspeaker 11 is located and the light intensity value is transmitted to the loudspeaker 11 so that the loudspeaker 11 is capable of controlling its own playing status based on the light intensity value. In this embodiment, the loudspeaker 11 is able to identify the ambient environment for selecting its own playing status based on the ambient environment in order to provide more intelligent service for the user.

Second Embodiment

Figure 3:
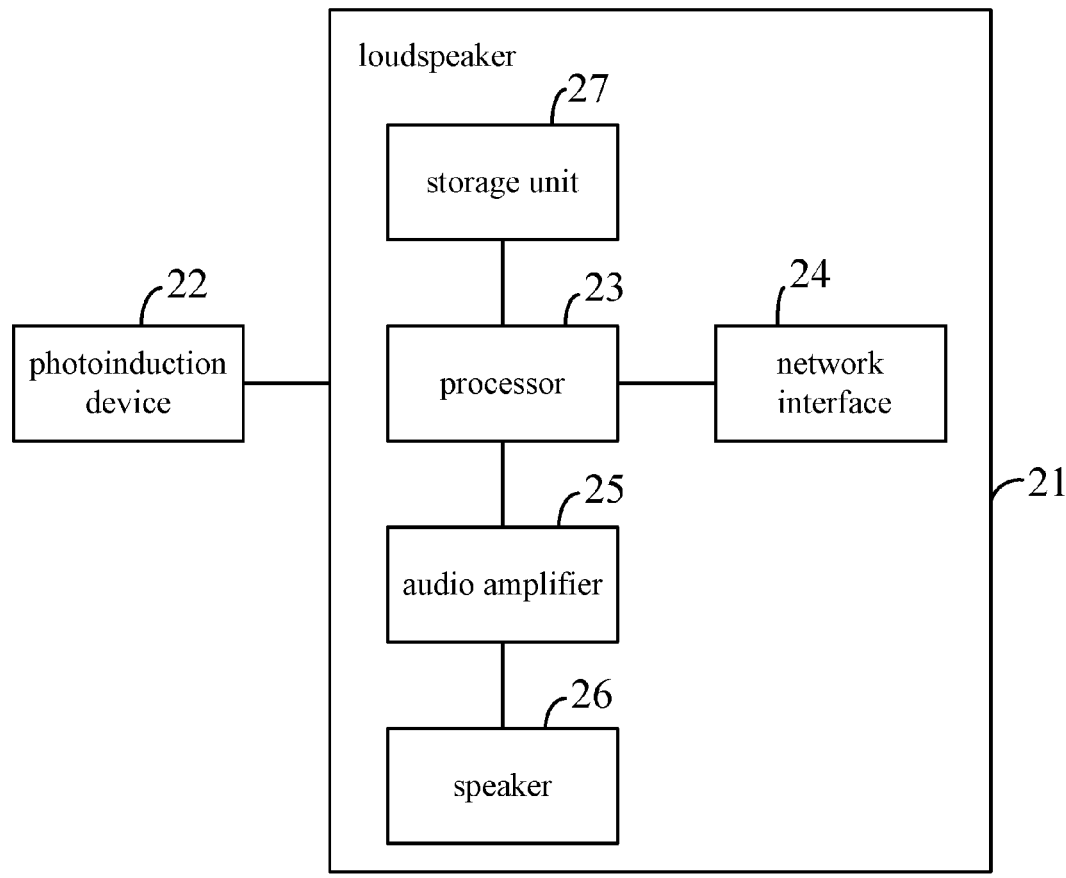
FIG. 3 is a block diagram of the photoinduction loudspeaker according to a second embodiment of the present invention.

Please refer to FIG. 3, which is a block diagram of the photoinduction loudspeaker according to a second embodiment. As shown in FIG. 3, the photoinduction loudspeaker in the second embodiment includes a loudspeaker 21 and a photoinduction device 22 wherein the loudspeaker 21 includes a processor 23, a network interface 24, an audio amplifier 25, a speaker 26, and a storage unit 27.

In this embodiment, the photoinduction device 22 is configured to acquire a light intensity value of an ambient environment where the photoinduction loudspeaker is located and a transmission unit transmits the light intensity value to the processor 23. The loudspeaker 21 is capable of controlling the playing status of the photoinduction loudspeaker based on the light intensity value. In details, the photoinduction device 22 acquires an analog value of the light intensity value using the photosensors and a digital value of the light intensity value using the analog-to-digital which converts the analog value into the digital value of light intensity. The photoinduction device 22 is connected to the processor 23 via a digital bus, such as Inter Integrated Circuit (I2C), Universal Asynchronous Receiver Transmitter (UART) and Serial Peripheral Interface (SPI). The processor 23 acquires the digital value of the light intensity value of the photoinduction loudspeaker in the current ambient environment from the photoinduction device 22 via the digital bus.

For example, the processor 23 receives the light intensity value acquired by the photoinduction device 22 of the ambient environment where the photoinduction loudspeaker is located and adjusts the volume level based on the acquired light intensity value. Any one of the following scenes can be taken. In one scene, when the user dims the light in the bedroom before going to bed, meanwhile, the light intensity value is decreased and the processor 23 controls the photoinduction loudspeaker for automatically lowering the volume level to give the user a good night's sleep. In another scene, the processor 23 controls the photoinduction loudspeaker based on the light intensity value for automatically selecting the music style and types. Still in another scene, the processor 23 controls the photoinduction loudspeaker to be automatically shut off when the processor 23 ensures that the acquired light intensity value is less than a threshold value. For example, the processor 23 controls the photoinduction loudspeaker to enter a standby mode or shuts off when the user turns off the light to go to bed.

The loudspeaker 21 further includes the network interface 24 which serves as a channel either to allow the photoinduction loudspeaker to transmit the data or to allow the processor 23 to acquire data resource from the Internet. In details, the network interface 24 is a cable network interface or a wireless network interface, such as a wireless interface compatible to 802.11 protocol or wireless communication interface compatible to Bluetooth protocol. The processor 23 is connected to the Internet via the network interface 24 to acquire the streaming music from the Internet. The processor 23 is connected to at least one control terminal, e.g. a smartphone and/or computer, via the network interface 24 to receive a plurality of control instructions such as a play, stop, turn-on and turn-off commands.

The loudspeaker 21 further includes the audio amplifier 25 and the speaker 26. The audio amplifier 22 receives an analog audio signal transmitted by the processor 23 to perform a power amplification of the analog audio signal for driving the speaker 26 to generate the sound. In details, after the processor 23 utilizes a decoding or digital-analog conversion process of the audio data, the decoded or converted audio data is sent to the audio amplifier 22. The audio amplifier 22 performs the power amplification of the analog audio signal for driving the speaker 26 to generate the sound.

The loudspeaker 21 further includes the storage unit 27 for storing at least one type of the following data: data resource acquired by the processor, operations executed by the processor and the loudspeaker configuration data, such as network connection data, loudspeaker size and a playlist of the songs.

In the second embodiment, the loudspeaker 21 is combined to the photoinduction device to allow the photoinduction device 22 to acquire the light intensity value of the ambient environment where the loudspeaker is located and the light intensity value is transmitted to the loudspeaker 21 so that the loudspeaker 21 is capable of controlling its own playing status based on the light intensity value. In this embodiment, the photoinduction loudspeaker is able to identify the ambient environment for selecting its own playing status based on the identified ambient environment in order to provide more intelligent service for the user.

Third Embodiment

Figure 4:
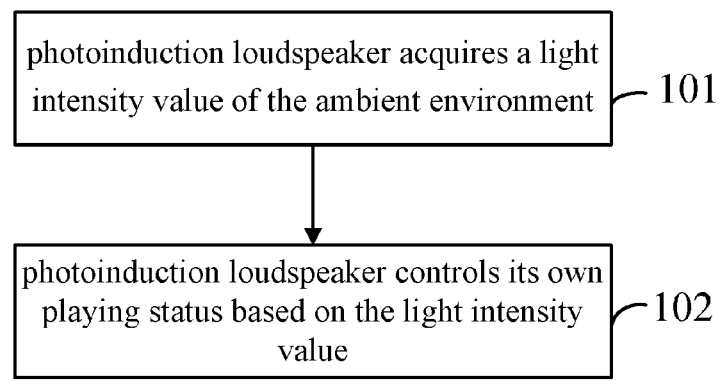
FIG. 4 is a flow chart of a photoinduction loudspeaker control method according to a third embodiment of the present invention.

Please refer to FIG. 4, which is a flow chart of a photoinduction loudspeaker control method according to a third embodiment of the present invention. The photoinduction loudspeaker control method can be performed by a photoinduction loudspeaker control apparatus, which is integrated to the photoinduction loudspeaker, wherein the photoinduction loudspeaker control apparatus is implemented by hardware and/or software.

The photoinduction loudspeaker control method includes the following steps:

In step 101, the photoinduction loudspeaker acquires a light intensity value of the ambient environment.

In this embodiment, the photoinduction loudspeaker acquires the light intensity value of the ambient environment. For example, the photoinduction loudspeaker control apparatus integrated to the photoinduction loudspeaker is cable of acquiring the light intensity value of the ambient environment wherein the photoinduction loudspeaker control apparatus includes optical sensors or photosensors for acquiring the light intensity value of the ambient environment where the photoinduction loudspeaker is located.

In this embodiment, the photoinduction loudspeaker acquires the light intensity value of the ambient environment where the photoinduction loudspeaker is located, which includes the step of: the photoinduction loudspeaker acquires the analog value of the light intensity value of the ambient environment where the photoinduction loudspeaker is located in order to convert the analog value into a digital value of the light intensity value.

In step 102, the photoinduction loudspeaker controls its own playing status based on the light intensity value.

In this embodiment, the photoinduction loudspeaker controls its own playing status based on the light intensity value.

In one embodiment, the playing status includes at least one of the following statuses: playing the songs, adjusting the volume of the songs, stopping the playback of songs, turning on the loudspeaker, switching to a standby mode or turning off the loudspeaker based on the light intensity value.

In this embodiment, the photoinduction loudspeaker is capable of adjusting the volume based on the light intensity value. Any one of the following scenes can be taken. In one scene, when the user dims the light in the bedroom before going to bed, meanwhile, the light intensity value is decreased and the photoinduction loudspeaker is capable of automatically lowering the volume level to give the user a good night's sleep. In another scene, the photoinduction loudspeaker automatically selects the music style and types based on the light intensity value. Still in another scene, the photoinduction loudspeaker automatically shuts off when the light intensity value acquired by the photoinduction loudspeaker is less than a threshold value. For example, the photoinduction loudspeaker enters a standby mode or shuts off when the user turns off the light to go to bed.

In the third embodiment, the photoinduction loudspeaker acquires the light intensity value of the ambient environment where the photoinduction loudspeaker is located and controls its own playing status based on the light intensity value. In this embodiment, the photoinduction loudspeaker control method is able to identify the ambient environment for selecting its own playing status based on the identified ambient environment in order to provide more intelligent service for the user.

Fourth Embodiment

Figure 5:
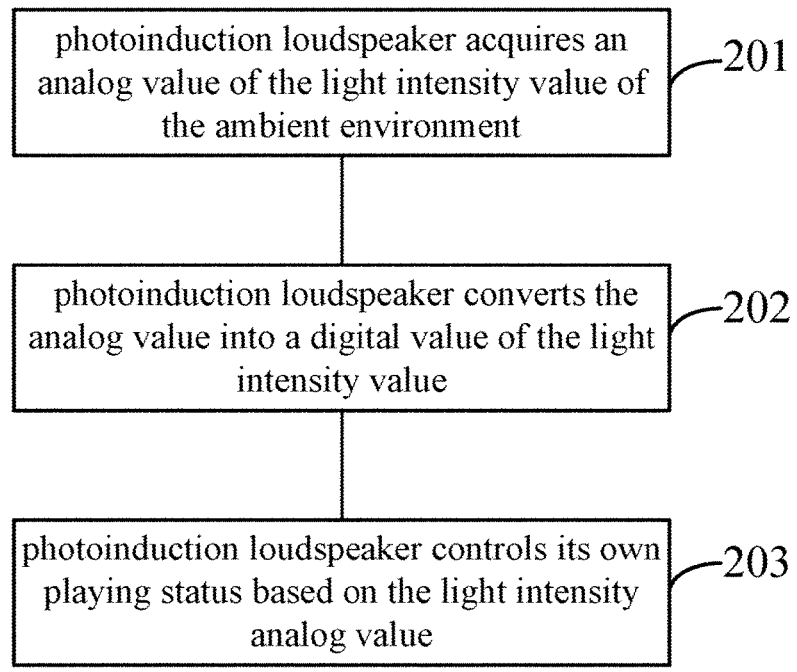
FIG. 5 is a flow chart of a photoinduction loudspeaker control method according to a fourth embodiment of the present invention.

Please refer to FIG. 5, which is a flow chart of a photoinduction loudspeaker control method according to a fourth embodiment of the present invention. The fourth embodiment is an optimized example based on the third embodiment. In this embodiment, the step of acquiring a light intensity value of the ambient environment by the photoinduction loudspeaker is optimized that the photoinduction loudspeaker acquires an analog value of the light intensity value of the ambient environment where the photoinduction loudspeaker is located in order to convert the analog value into a digital value of the light intensity value.

Preferably, the playing status includes at least one of the following statuses: playing the songs, adjusting the volume of the songs, stopping the playback of songs, turning on the loudspeaker, switching to a standby mode or turning off the loudspeaker based on the light intensity value.

Correspondingly, the photoinduction loudspeaker control method includes the following steps:

In step 201, the photoinduction loudspeaker acquires an analog value of the light intensity value of the ambient environment.

In this embodiment, the photoinduction loudspeaker acquires the analog value of the light intensity value of the ambient environment. For example, the photoinduction loudspeaker control apparatus integrated to the photoinduction loudspeaker is cable of acquiring the analog value of the light intensity value of the ambient environment wherein the photoinduction loudspeaker control apparatus includes optical sensors or photosensors for acquiring the analog value of the light intensity value of the ambient environment where the photoinduction loudspeaker is located.

In step 202, the photoinduction loudspeaker converts the analog value into a digital value of the light intensity value.

In this embodiment, the photoinduction loudspeaker converts the analog value into a digital value of the light intensity value. For example, the photoinduction loudspeaker control apparatus integrated to the photoinduction loudspeaker converts the analog value into the digital value of the light intensity value wherein an analog-to-digital converter is integrated to the photoinduction loudspeaker control apparatus.

In step 203, the photoinduction loudspeaker controls its own playing status based on the light intensity analog value.

In this embodiment, the photoinduction loudspeaker controls its own playing status based on the light intensity analog value.

The playing status includes at least one of the following statuses: playing the songs, adjusting the volume of the songs, stopping the playback of songs, turning on the loudspeaker, switching to a standby mode or turning off the loudspeaker based on the light intensity value.

For example, the photoinduction loudspeaker is capable of adjusting the volume based on the light intensity analog value. Any one of the following scenes can be taken. In one scene, when the user dims the light in the bedroom before going to bed, meanwhile, the light intensity analog value is decreased and the photoinduction loudspeaker is capable of automatically lowering the volume level for giving the user a good night's sleep. In another scene, the photoinduction loudspeaker automatically selects the music style and types based on the light intensity analog value. Still in another scene, the photoinduction loudspeaker automatically shuts off when the light intensity analog value acquired by the photoinduction loudspeaker is less than a threshold value. For example, the photoinduction loudspeaker enters a standby mode or shuts off when the user turns off the light to go to bed.

In the fourth embodiment, the photoinduction loudspeaker acquires the light intensity analog value of the ambient environment where the photoinduction loudspeaker is located and controls its own playing status based on the light intensity analog value. In this embodiment, the photoinduction loudspeaker control method is able to identify the ambient environment for selecting its own playing status based on the identified ambient environment in order to provide more intelligent service for the user.

Fifth Embodiment

Figure 6:
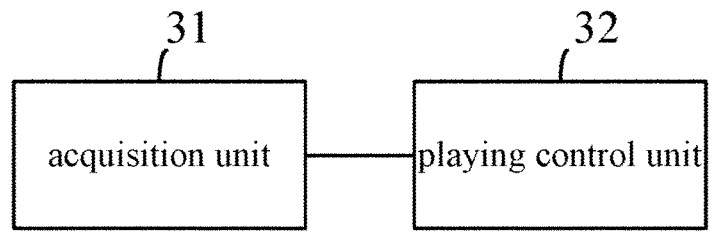
FIG. 6 is a block diagram of a photoinduction loudspeaker control apparatus according to a fifth embodiment of the present invention.

Please refer to FIG. 6, which is a block diagram of a photoinduction loudspeaker control apparatus according to a fifth embodiment of the present invention. As depicted in FIG. 6, the photoinduction loudspeaker control apparatus includes an acquisition unit 31 and a playing control unit 32.

The acquisition unit 31 is configured to acquire a light intensity value of the ambient environment where the loudspeaker is located.

In this embodiment, the acquisition unit 31 is integrated with one or more optical sensors or photosensors and acquires the light intensity value of the ambient environment where the photoinduction loudspeaker is located using the optical sensors or photosensors.

The playing control unit 32 is capable of controlling playing status of the photoinduction loudspeaker based on the light intensity value.

For example, the playing status includes at least one of the following statuses: playing the songs, adjusting the volume of the songs, stopping the playback of songs, turning on the loudspeaker, switching to a standby mode or turning off the loudspeaker based on the light intensity value.

In this embodiment, the playing control unit 32 is based on the light intensity value acquired by the acquisition unit 31 in the ambient environment where the photoinduction loudspeaker is located and the playing control unit 32 adjusts the volume outputted by the photoinduction loudspeaker based on the acquired light intensity value. Any one of the following scenes can be taken. In one scene, when the user dims the light in the bedroom before going to bed, meanwhile, the light intensity value is decreased and the playing control unit 32 controls the photoinduction loudspeaker to lower the volume level for giving the user a good night's sleep. In another scene, the playing control unit 32 is based on the light intensity value acquired by the acquisition unit 31 to control the photoinduction loudspeaker for selecting the music style and types. Still in another scene, the playing control unit 32 controls the photoinduction loudspeaker automatically to be turned off when the playing control unit 32 ensures that the acquired light intensity value is less than a threshold value. For example, the playing control unit 32 controls the photoinduction loudspeaker to enter a standby mode or to be shut off when the user turns off the light to go to bed.

In the fifth embodiment, the acquisition unit 31 acquired the light intensity analog value of the ambient environment where the photoinduction loudspeaker is located in order to convert the light intensity analog value into a light intensity digital value.

The present invention provides a photoinduction loudspeaker control apparatus to perform a photoinduction loudspeaker control method and includes corresponding functional units to implement the same beneficial effects.

Person skilled in the art should be noted that the modules, units or steps in the present invention can be implemented by servers described in the above. The embodiments of the present invention can be performed by application programs executed by a computing device so that the application programs stored in the storage device are executed by a processor. The application programs are stored in a storage media which is read by the computing device wherein the storage media is selected from one group consisting of read-only memory, hard disk drive and optical disk. Alternatively, the application programs are composed of a plurality of integrated circuits. The modules, units or steps are performed by a single integrated circuit. Thus, the implement of the present invention is not limited to the combination of hardware or software components.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structures.

What is claimed is:

1. A photoinduction loudspeaker, characterized in that the photoinduction loudspeaker comprises a loudspeaker and a photoinduction device;
   wherein the photoinduction device is configured to acquire a light intensity value of an ambient environment where the loudspeaker is located and the photoinduction device transmits the light intensity value to the loudspeaker;
   wherein the loudspeaker controls its own playing status based on the light intensity value; and
   wherein when the light intensity value acquired by the loudspeaker decreases, the loudspeaker is configured to lower a volume level of playing songs; the loudspeaker is configured to select music styles and types based on the light intensity value acquired by the loudspeaker, and configured to play songs with the selected styles and types; and when the light intensity value acquired by the loudspeaker is less than a threshold value, the loudspeaker is configured to switch to a standby mode of the playing status based on the light intensity value, and wherein the playing status during the standby mode is further selected from one or more of the following: stopping the playback of songs and turning off the loudspeaker.

2. The photoinduction loudspeaker of claim 1, characterized in that the photoinduction device comprises a photosensor and a transmission unit;
   wherein the photosensor is configured to acquire the light intensity value of the ambient environment where the loudspeaker is located;
   wherein the transmission unit is configured to transmit the light intensity value to the loudspeaker.

3. The photoinduction loudspeaker of claim 2, characterized in that the photoinduction device further comprises an analog-to-digital converter;
   wherein the photosensor is configured to acquire an analog value of the light intensity value of the ambient environment where the loudspeaker is located;
   wherein the analog-to-digital converter is configured to acquire the analog value of the light intensity value into a digital value of the light intensity value.

4. The photoinduction loudspeaker of claim 1, characterized in that the photoinduction loudspeaker further comprises a processor;
   wherein the processor is connected to the photoinduction device via a digital bus, and is configured to receive the light intensity value, which is acquired by the photoinduction device, of the ambient environment where the loudspeaker is located, and controls the playing status of the loudspeaker based on the light intensity value.

5. A photoinduction loudspeaker control method, characterized in that the method comprises:
   acquiring a light intensity value of an ambient environment where a photoinduction loudspeaker is located by the photoinduction loudspeaker; and
   controlling a playing status of the photoinduction loudspeaker based on the light intensity value by the photoinduction loudspeaker;
   wherein when the light intensity value acquired by the loudspeaker decreases, the loudspeaker is configured to lower a volume level of playing songs; the loudspeaker is configured to select music styles and types based on the light intensity value acquired by the loudspeaker, and configured to play songs with the selected styles and types; and when the light intensity value acquired by the photoinduction loudspeaker is less than a threshold value, the photoinduction loudspeaker is configured to switch to a standby mode of the playing status based on the light intensity value, and wherein the playing status during the standby mode is further selected from one or more of the following: stopping the playback of songs and turning off the loudspeaker.

6. The photoinduction loudspeaker control method of claim 5, characterized in that acquiring the light intensity value of the ambient environment where the photoinduction loudspeaker is located comprises:
   acquiring an analog value of the light intensity value of the ambient environment where the photoinduction loudspeaker is located and converting the analog value of the light intensity value into a digital value of the light intensity value by the photoinduction loudspeaker.

7. A photoinduction loudspeaker control apparatus, characterized in that the photoinduction loudspeaker control apparatus comprises:
   an acquisition unit, configured to acquire a light intensity value of an ambient environment where a photoinduction loudspeaker is located; and
   a playing control unit, configured to control a playing status of the photoinduction loudspeaker based on the light intensity value;
   wherein when the light intensity value acquired by the loudspeaker decreases, the loudspeaker is configured to lower a volume level of playing songs; the loudspeaker is configured to select music styles and types based on the light intensity value acquired by the loudspeaker, and configured to play songs with the selected styles and types; and when the light intensity value acquired by the photoinduction loudspeaker is less than a threshold value, the photoinduction loudspeaker is configured to switch to a standby mode of the playing status based on the light intensity value, and wherein the playing status during the standby mode is further selected from one or more of the following: stopping the playback of songs and turning off the loudspeaker.

8. The photoinduction loudspeaker control apparatus of claim 7, characterized in that the acquisition unit is configured to acquire an analog value of the light intensity value of the ambient environment where the photoinduction loudspeaker is located and converts the analog value of the light intensity value into a digital value of the light intensity value.

9. The photoinduction loudspeaker of claim 2, characterized in that the photoinduction loudspeaker further comprises a processor;
   wherein the processor is connected to the photoinduction device via a digital bus, and is configured to receive the light intensity value, which is acquired by the photoinduction device, of the ambient environment where the loudspeaker is located, and controls the playing status of the loudspeaker based on the light intensity value.

10. The photoinduction loudspeaker control method of claim 5, characterized in that acquiring the light intensity value of the ambient environment where the photoinduction loudspeaker is located comprises: acquiring an analog value of the light intensity value of the ambient environment where the photoinduction loudspeaker is located and converting the analog value of the light intensity value into a digital value of the light intensity value by the photoinduction loudspeaker.

11. The photoinduction loudspeaker control apparatus of claim 7, characterized in that the acquisition unit is configured to acquire an analog value of the light intensity value of the ambient environment where the photoinduction loudspeaker is located and converts the analog value of the light intensity value into a digital value of the light intensity value.

\* \* \* \* \*